United States Patent [19]

Tsuji et al.

[11] Patent Number: 4,918,300

[45] Date of Patent: Apr. 17, 1990

[54] OPTICAL PICKUP SYSTEM HAVING MULTIPLE DIFFRACTION DEVICES AND LENS HOLDING MEANS

[75] Inventors: Shigeki Tsuji; Hiroshi Ogata, both of Hiroshima, Japan

[73] Assignee: Sharp Kabushiki Kaisha, Osaka, Japan

[21] Appl. No.: 324,653

[22] Filed: Mar. 17, 1989

[30] Foreign Application Priority Data

Mar. 17, 1988 [JP] Japan .................................. 63-65512

[51] Int. Cl.$^4$ .............................................. G01J 1/20
[52] U.S. Cl. ..................................... 250/201.1; 369/46
[58] Field of Search ................... 250/201 R, 204, 578, 250/201 DF, 201 AF; 369/44, 45, 46

[56] References Cited

U.S. PATENT DOCUMENTS

4,473,746  9/1984  Edmonds ........................... 250/216
4,654,519  3/1987  Ando ................................... 250/201

Primary Examiner—David C. Nelm
Assistant Examiner—William Oen
Attorney, Agent, or Firm—Birch, Stewart, Kolasch & Birch

[57] ABSTRACT

An optical pickup device for reading signal pits on a disk includes a light source, first and second diffraction devices, a first holding member for holding a photosensor and a hollow second holding member for holding an object lens, wherein the first holding member may be rotated inside the second holding member. It is therefore possible to adjust the alignment direction of three light spots projected on an optical disk.

5 Claims, 7 Drawing Sheets

OPTICAL PICKUP SYSTEM HAVING MULTIPLE DIFFRACTION DEVICES AND LENS HOLDING MEANS

BACKGROUND OF THE INVENTION

1. Field of the Invention

This invention relates to an improved optical pickup device employed for recording/reproducing information on an optical disk.

2. Background Art

Figure 4A:
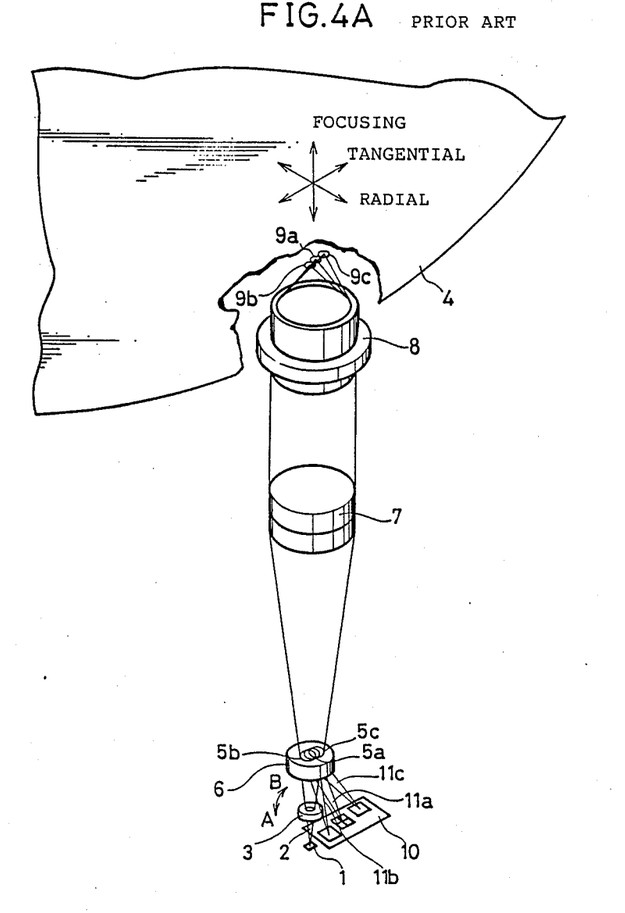
FIG. 4A is a perspective view diagrammatically showing the optical system separated from the conventional optical pickup device.
Figure 4B:
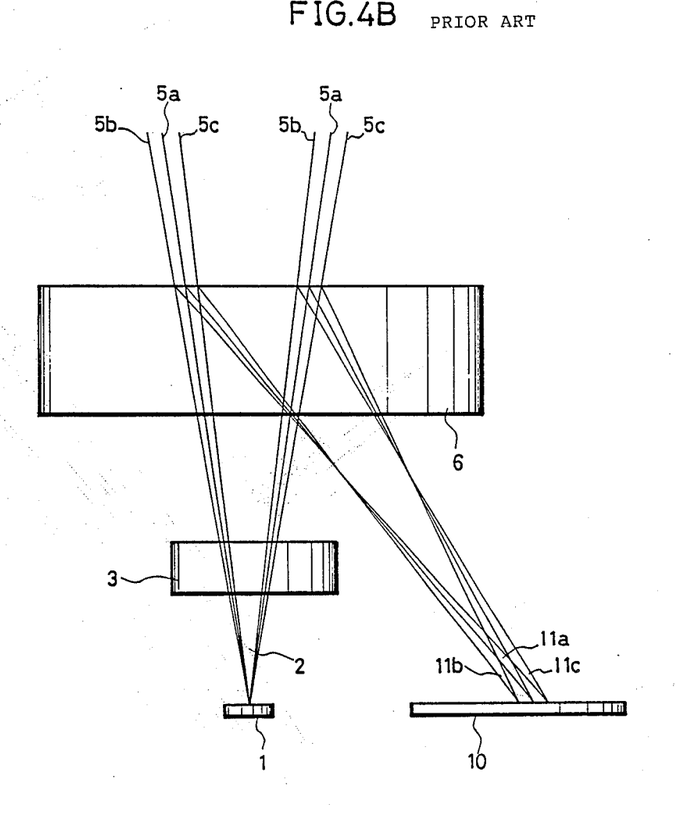
FIG. 4B is an enlarged side elevation showing a portion of the optical system of FIG. 4A.

FIG. 4A is a diagrammatic perspective view illustrating an optical system separated from a conventional optical pickup device, and FIG. 4B is an enlarged partial side elevation of the optical system shown in FIG. 4A. Referring to these figures, a laser light beam 2 emitted from an optical source 1 is split by a diffraction grating 3 into a zeroth order diffracted light beam 5 for reading signal pits on the disk 4 and for detecting focusing errors and a pair of first order diffracted light beams 5b and 5c for detecting tracking errors.

The three split laser beams 5a, 5b and 5c are passed through a holographic grating 6 and collimated by a collimator 7 into parallel beams which are focused by an object lens 8 to form three corresponding light spots 9a, 9b and 9c on an information surface of a disc 4. At this time, the first order light spots 9b and 9c need be aligned with the tangential direction of the disc 4, that is, with the arraying direction of the signal pits, with the zeroth order light spot 9a as the center of symmetry..

The laser light beams reflected on the information surface of the disc 4 are returned on the same light path and, after passing through the collimator 7, again fall on the holographic grating 6 as they are collimated. The laser light having passed through the holographic grating 6 is separated into laser light beams 11b and 11c for detecting tracking errors and a laser light beam 11a for detecting focusing errors and radio frequency (RF) signals before they are deviated and fall on a photosensor 10.

In the photosensor 10, focusing error signals obtained by a kind of the wedge prism method, RF signals associated with the pits on the disk 4 and tracking error signals obtained by a three beam method, are detected.

In the conventional optical pickup device, when adjusting the direction of alignment of the light spots 9b and 9c on the disk 4 corresponding to a pair of first order light beams 5b and 5c for detecting the tracking errors, it is necessary to rotate the first order light spots 9b and 9c about the zeroth order light spot 9a as center, by rotating the diffraction grating 3 along the direction of arrow marks A and B about the optical axis as center.

However, in the conventional optical pickup device, it is extremely difficult to provide a mechanism for rotating the diffraction grating 3, because of the extremely narrow distance between the light source 1 and the holographic grating 6.

Also the provision of such rotating mechanism results in an increased number of component parts and an increased size and manufacturing cost of the optical pickup device.

SUMMARY OF THE INVENTION

In view of the above described prior art, it is an object of the present invention to provide an optical pickup device which is compact and able to adjust the direction of alignment of light spots for detecting tracking errors.

It is another object of the present invention to provide an optical pickup device wherein the optical axis of the optical components is not deviated in case when an adjustment is made of the direction of alignment of the light spots for detecting tracking errors.

An optical pickup device for reading signal pits on a disk comprises a light source, first diffraction means for splitting a light beam emitted along an axis from said light source into a zeroth order diffracted light beam for reading said signal pits and a plurality of first order diffracted light beams for detecting errors in tracking along the row of said signal bits, an object lens for focusing each of said diffracted light beams on said disk and forming a corresponding plurality of light spots, second diffraction means for separating from each other and deviating light beams reflected from said light spots and gathered by said object lens, photosensor means for detecting the light beams having passed through said second diffraction means, a first holding means for holding said light source, said first and second diffraction means and said photosensor means, and a second holding means for holding said object lens, said second holding means including a substantially cylindrical hollow section, said first holding means including a substantially cylindrical outer peripheral portion mating inside said hollow section so that said first holding means may be rotated relative to said second holding means about the axis of said light beam emitted from said light source.

Thus, by rotating the first holding means, the first diffraction means is rotated so that the first order light spots on the disk for detecting the tracking errors may be rotated about the zeroth order light spot and, as a result, the first order light spots may be aligned with the arraying direction of the signal pits.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
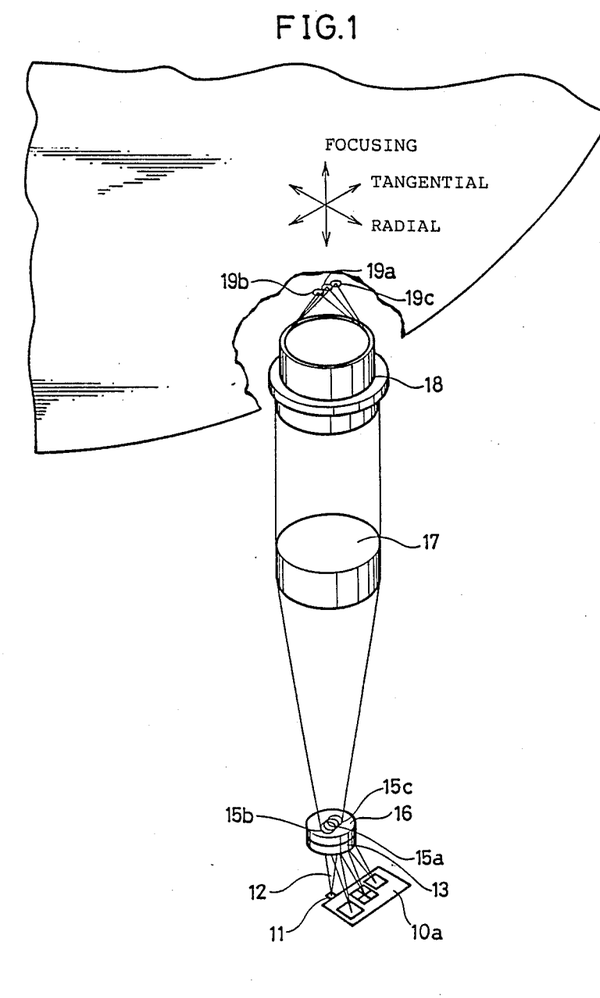
FIG. 1 is a perspective view diagrammatically showing the optical system separated from the optical pickup device according to a preferred embodiment of the present invention.

FIG. 1 is a diagrammatic perspective view showing an optical system separated from an optical pickup device according to an embodiment of the present invention. In this figure, a laser light beam 12 emitted from a light source 11 enters on a diffraction grating 13 and a holographic grating 16 stacked in contact with each other. As the laser light beam 12 is passed through the diffraction grating 13, it is split into a zeroth order diffracted light beam 15a for reading signal pits on the optical disk 4 and a pair of first order diffracted light beams 15b, 15c for reading tracking errors.

After passing through the holographic grating 16, the three laser light beams 15a, 15b and 15c are collimated by a collimator 17 into parallel light beams which are focused by an object lens 18 to form three corresponding light spots 19a, 19b and 19c on a disk 14. Thus the zeroth order light spot 19a is formed by the zeroth order diffracted light beam 15a, while the first order light spots 19a and 19c are formed by the first order diffracted light beams 15b and 15c.

The laser light beams reflected from the information recording surface of the disk 14 are returned on the same light path to fall on the holographic grating 16 as they are collimated by the collimator 17. These reflected laser light beams are diffracted and deviated by the holographic grating 16 to fall on a photosensor 10a.

In the photosensor 10a, there are detected focussing error signals by a kind of the wedge prism method, tracking error signals by a three-beam method and RF signals correlated with signal pits on the disk 14.

Figure 2A:
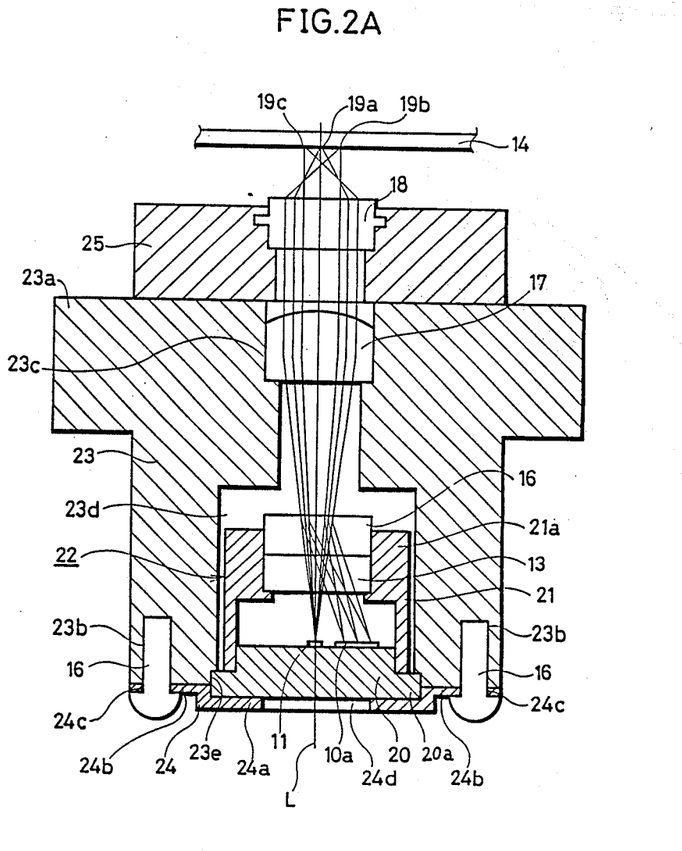
FIG. 2A is a longitudinal sectional view diagrammatically showing an example of the optical pickup device including the optical system of FIG. 1.
Figure 2B:
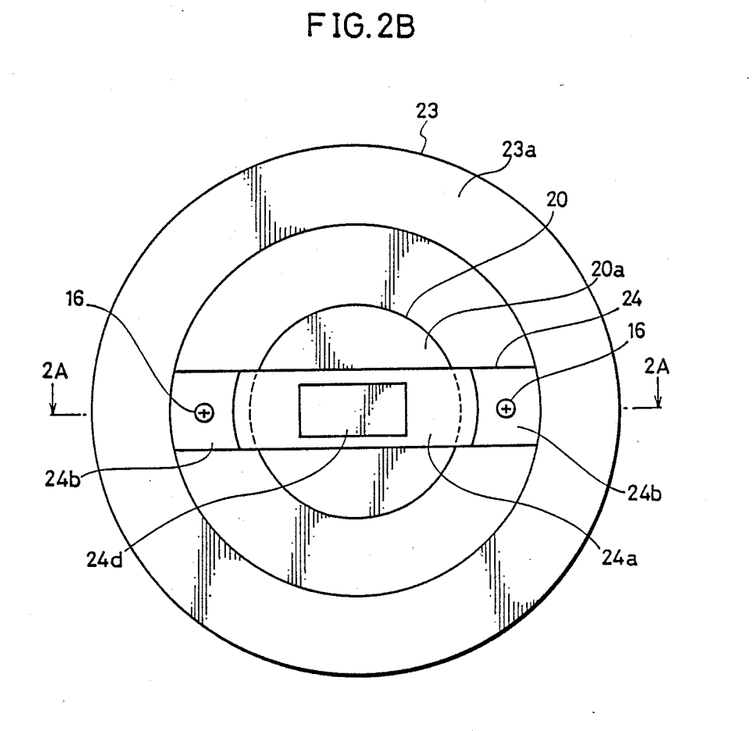
FIG. 2B is a diagrammatic bottom plan view of the device shown in FIG. 2A.

FIG. 2A is a longitudinal sectional view diagrammatically showing an optical pickup device including the optical system shown in FIG. 1, and FIG. 2B is a diagrammatic bottom plain view of the device shown in FIG. 2A. A line 2A—2A in FIG. 2B represents a section line corresponding to FIG. 2A.

Referring to these figures, the light source 11 is fixed at the center on an upper surface of a substantially disk-shaped base plate 20, while the photosensor 10a is fixed on the same upper surface and slightly away from the light source 11. The lower half of the base plate 20 is formed with a projecting peripheral portion 20a. A hollow holding tube 21 has its lower half fixed to the projecting peripheral portion 20a of the base plate 20. The upper half of the holding tube 21 is formed with an inwardly projecting thickened holding section 21a on which the diffraction grating 13 and the holographic grating 16 are fixed. The diffraction grating 13 and the holographic grating 16 are arranged so that the central axes thereof coincide with an optical axis L of the laser light emitted from the light source 11. A lens barrel 22 is formed by the base plate 20, holding tube 21, diffraction grating 13 and holographic grating 16.

A lens barrel holder 23 in the form of a hollow cylinder has a projecting outer peripheral portion 23a at its upper end and a pair of screw holes 23b on its bottom surface. A lens holding section 23c is formed at the upper inner peripheral portion of the lens barrel holder 23 and holds the collimator 17. At this time, the axis of the collimator 17 coincides with the optical axis L of the laser beam.

The lower half of the lens barrel holder 23 is formed with a lens barrel holding section 23d having an inside diameter larger than the outside diameter of the holding tube 21. The lower end of lens barrel holding section 23d is formed with a fitting portion 23e having an inside diameter about equal to the outside diameter of the projecting portion 20a of the base plate 20.

The lens barrel 22 is introduced into the lens barrel holding section 23d from the lower end of the lens barrel holder 23 so that the projecting outer peripheral portion 20a of the base plate 20 fits with the fitting portion 23e. In this manner, the lens barrel 22 is supported rotatively with respect to the lens barrel holder 23 with the fitting portion 23e as a guide.

A plate spring 24 has a recess 24a for mating with the bottom section 20a of the base plate 20 and a fixing section 24b having a pair of small apertures 24c for the pair of screws 16. An opening 24d is formed at the center of the recess 24a for taking out electrical terminals. Hence, by manually gripping and rotating the bottom section 20a of the base plate 20, the lens barrel can be rotated with respect to the lens barrel holder 23 with the fitting portion 23e as a guide. At this time, the light source 11 is positioned at the center of rotation of the base plate 20, so that the center of rotation of the lens barrel 22 coincides with the optical axis L of the laser light beam.

An object lens driving section 25 has an object lens 18. The object lens driving section 25 is held on the upper surface of the lens barrel holder 23 so that the central axis of the object lens 18 coincides with the optical axis L. The object lens driving section 25 drives the object lens 18 by a well-known driving system so that the focal point of the laser light beam will be formed correctly on the disk 14.

In the optical pickup device shown in FIGS. 2A and 2B, when the lens barrel 22 is rotated with the peripheral portion 20a of the base plate 20 gripped manually, the diffraction grating 13 is also rotated in unison with the lens barrel 22, so that the pair of first order light spots 19b and 19c for detecting tracking errors may be rotated about the zeroth order light spot 19a for reading signal pits as a center. In this manner, the first order light spots 19b and 19c may be aligned with the arraying direction of the signal pits. That is, tracking error signal adjustment in the three-beam method can be made even in the case of an extremely narrow interval between the light source 11 and the holographic grating 16. It is noted that the optical pickup device shown in FIGS. 2A and 2B is not increased in size because it is simple in structure and made up of a small number of components.

Figure 3A:
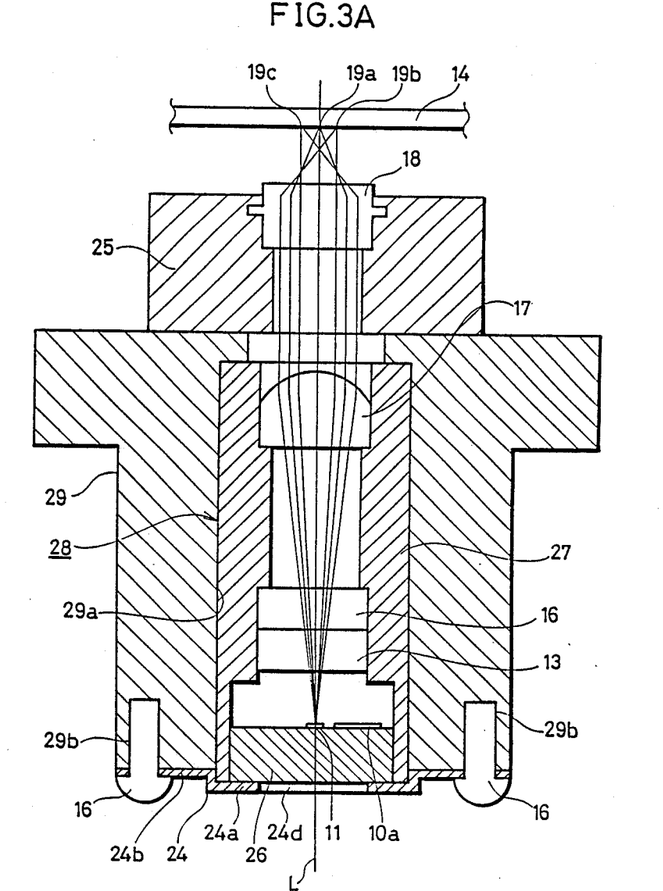
FIG. 3A is a longitudinal sectional view diagrammatically showing the optical pickup device according to a modified embodiment of the present invention.
Figure 3B:
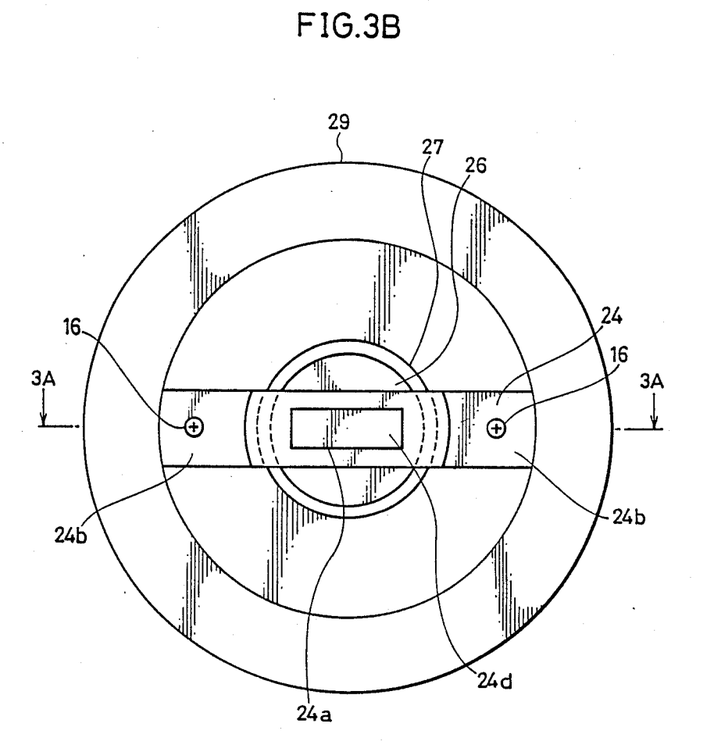
FIG. 3B is a diagrammatic bottom plan view of the device of FIG. 3A.

FIG. 3A is a sectional view showing diagrammatically another optical pickup device according to a modified embodiment of the present invention, and FIG. 3B is a diagrammatic bottom plan view of the device of FIG. 3A. The line 3A—3A in FIG. 3B represents the section line corresponding to FIG. 3A. In FIGS. 3A and 3B, the same or corresponding parts are designated by the same reference symbols.

Referring to FIGS. 3A and 3B, the light source 11 is fixed at the center of the upper surface of a disk-shaped base plate 26, and the photosensor 10a is also fixed thereon in proximity to the light source 11.

A hollow holding tube 27 holds the diffraction grating 13 and the holographic grating 16 at the mid portion of a hollow section thereof while holding the collimator at the upper end of the hollow section. The base plate 26 is introduced and fixed at the lower end of the hollow section of the holding tube 27. At this time, the diffraction grating 13, holographic grating 16 and the collimator 17 have their central axes coincident with the light axis L of the light source 11. A lens barrel 28 is formed by the holding tube 27 and the base plate 26.

A lens barrel holder 29 in the form of a hollow cylinder has a cylindrical lens barrel holding section 29a and a pair of screw holes 29b at its lower end. The lens barrel holding section 29a has its inside diameter substantially coincident with the outside diameter of the lens barrel 28. The lens barrel 28 is inserted and fitted inside the lens barrel holding section 29a. A plate spring 24 is fitted to the lower end of the lens barrel 28 and fixed to the lens barrel holder 29 by a pair of screws 16.

It will be understood that, in the optical pickup device shown in FIGS. 3A and 3B, the tracking error signals can be adjusted by rotating lens barrel 28 with the lower end of the lens barrel 28 gripped manually.

It will also be appreciated that, in the optical pickup device shown in FIG. 3A, not only the diffraction grating 13 and the holographic grating 16 but also the collimator 17 are accommodated inside the lens barrel 28, so that the axis of the collimator 17 is not deviated from the optical axis L on rotation of the lens barrel 28.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device for reading signal pits on a disk comprising:
    a light source,
    first diffraction means for splitting a light beam emitted along an axis from said light source into a zeroth order diffracted light beam for reading said signal pits and a plurality of first order diffracted light beams for detecting errors in tracking along the row of said signal bits,
    an object lens for focusing each of said diffracted light beams on said disk and forming a corresponding plurality of light spots,
    second diffraction means for separating from each other and deviating light beams reflected from said light spots and gathered by said object lens,
    photosensor means for detecting a plurality of light beams having passed through said second diffraction means,
    first holding means for holding said light source, said first and second diffraction means and said photosensor means, and
    second holding means for holding said object lens, said second holding means including a substantially cylindrical hollow section, said first holding means including a substantially cylindrical outer peripheral portion mating inside said hollow section, said first holding means being rotatable relative to said second holding means about the axis of said light beam emitted from said light source.

2. The optical pickup device according to claim 1 wherein said first holding means also holds a collimator.

3. The optical pickup device according to claim 1 wherein said light source is a semiconductor laser.

4. The optical pickup device according to claim 1 wherein said first diffraction means is a diffraction grating.

5. The optical pickup device according to claim 1 wherein said second diffraction means is a holographic grating.

* * * * *